United States Patent [19]

Johnson et al.

[11] Patent Number: 5,178,347
[45] Date of Patent: Jan. 12, 1993

[54] PROCESS OF LAUNCHING A CAPSULE INTO SPACE AND CORRESPONDING LAUNCHING MEANS

[75] Inventors: Claude Johnson, La Ferte Alais; Pierre Marx, Soisy S/Seine; Gérard Legrand, Evry, all of France

[73] Assignee: Centre National d'Etudes Spatiales, Paris, France

[21] Appl. No.: 552,192

[22] Filed: Jul. 13, 1990

[30] Foreign Application Priority Data

Jul. 17, 1989 [FR] France ................. 89 09581

[51] Int. Cl.⁵ ................................ B64G 1/10
[52] U.S. Cl. ................................ 244/158 R
[58] Field of Search ................. 244/158 R–172

[56] References Cited

U.S. PATENT DOCUMENTS 3,652,042  3/1972  Welther ............. 244/158 R
3,907,225  9/1975  Welther ............. 244/158 R

OTHER PUBLICATIONS

"Titan III Commercial Launch Services", Martin Marietta, Apr. 1987.

Primary Examiner—Galen Barefoot
Attorney, Agent, or Firm—Nixon & Vanderhye

[57] ABSTRACT

Disclosed is a method and apparatus for launching a capsule into a lower orbit in conjunction with the launch of a satellite into a higher energy orbit. The capsule is located in the launch vehicle so that, at burnout of the next-to-last stage of the launch vehicle, the altitude of velocity of the last stage capsule and satellite are sufficient to correspond to a desire orbit for said capsule. The capsule is released before ignition of the last stage during the ballistic phase of flight between the next-to-last stage and the last stage. After release of the capsule, the last stage is ignited permitting the satellite to be placed in the desired higher energy orbit. Particular preferred embodiments of the invention relates to slewing of the launched vehicle so as to release the capsule in predetermined directions apart from the launch direction so as to obtain a desired amount of separation between the capsule and the last stage prior to ignition of the last stage.

8 Claims, 4 Drawing Sheets

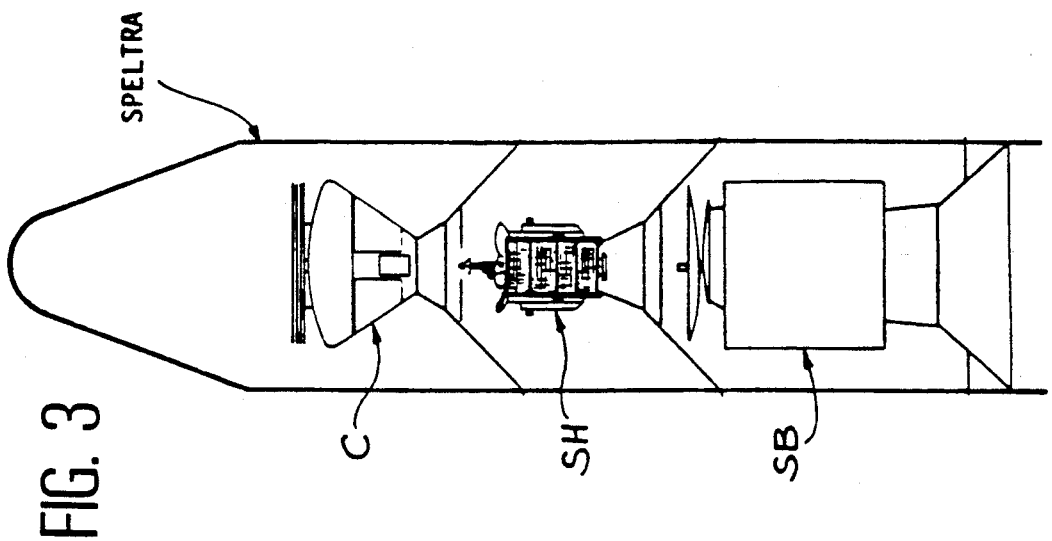
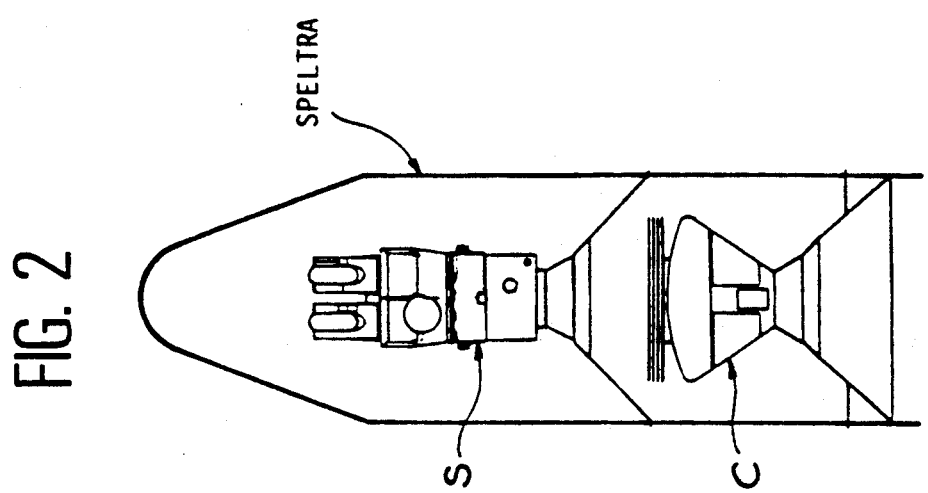
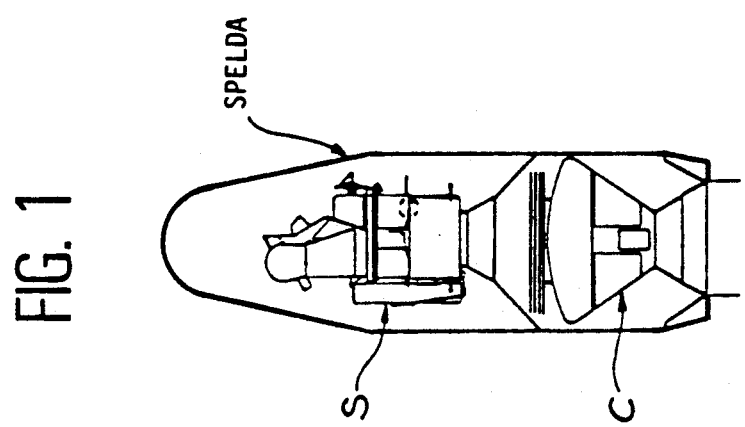

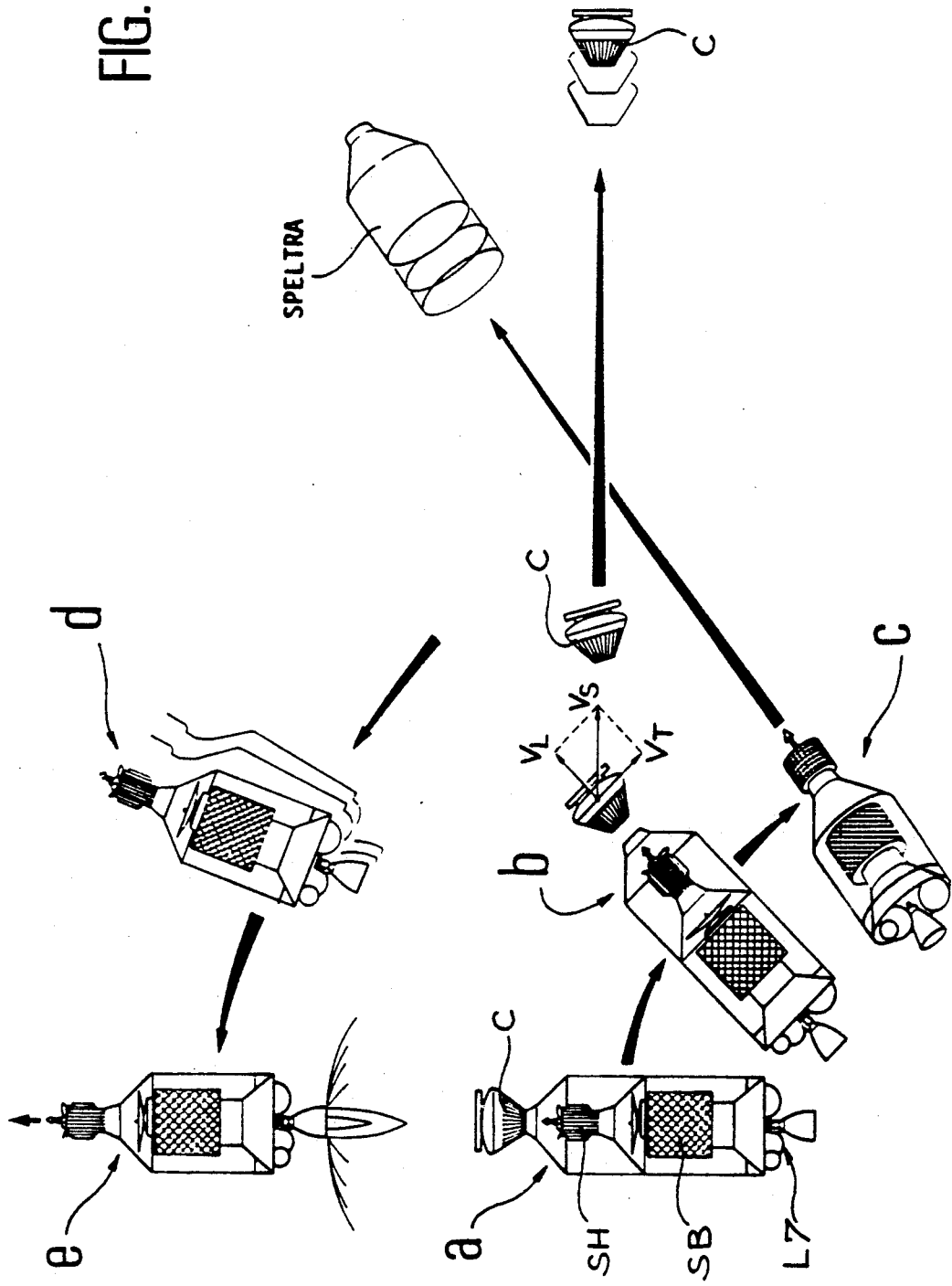

PROCESS OF LAUNCHING A CAPSULE INTO SPACE AND CORRESPONDING LAUNCHING MEANS

BACKGROUND OF THE INVENTION

1. Field of the Invention

This invention has as its object a process of launching a capsule into space and a corresponding launching means.

2. Discussion of Prior Art

Below, the word "capsule" is to be taken in the broad sense of means containing any payload, this means being able to be launched into space and to be recovered on earth. The word therefore does not at all prejudice the form of this means nor the nature of the payload.

The invention finds a preferred application in the field of microgravity research.

The main problem which the microgravity research comes up against today is that of means to create the conditions of this microgravity: if simulation means, such as the free-fall turns or the parabolic flights by aircraft, are used, the duration of the experiment is limited (from several seconds to several tens of seconds) and insufficient to carry out complex experiments.

The use of sounding rockets makes it possible to reach several minutes and to recover the payload, but the cost is increased by it and in any case the duration is still insufficient for a large number of missions. Further, the carried weight is limited by the size of the existing sounding rockets and the recourse to larger vehicles would appreciably increase the costs while the duration would remain small.

The experimentation orbital flight therefore is the means best suited to this research, but it assumes that suitable flight opportunities are available.

To meet this requirement, many solutions have been proposed that can be classified in three categories:

the launching of recoverable capsules by existing vehicles, such as Chinese launcher CZ2, U.S. launchers SCOUT and SUPER SCOUT, European launcher ARIANE 4, the development of small launchers whose main mission would be launching of payloads suited to microgravity, such as U.S. launcher PEGASUS launched from a bomber, or small powder launchers such as the LITTLE LEO launcher of the British firm ORDNANCE, the flight shared in existing capsules for which the experimenter would entrust his equipment to the developer of the system which would assure the launching and the recovery. This is what is proposed by China, which has already made several flights carrying European, particularly French, experiments, and by the Soviet Union with the Photon capsule. This solution results in low costs, but provides only very little control of the operation and no technological benefit in matters of the capsule, or reentry or of orbital operations.

The main drawback of these various solutions is to require a specific flight which, even with a small launcher, is costly: by way of example, a SCOUT launching costs about 12 million dollars to place a load of 200 kg at 500 km of altitude. It does not seem that the planned light launchers will be much more economical, because the SCOUT launcher already broadly reuses the stages designed and produced for heavier launchers.

In regard to the shared flight, it comes up against a double drawback:

the geostationary transfer orbit which is used is poorly suited to the recovery of a capsule because it leads to very high heat fluxes at the reentry and therefore requires heavy heat protections; it can further involve a very large dispersion of the impact zone, making the recovery more difficult, in spite of the sharing of the flight, the cost remains high for the microgravity payload, the transfer orbit being costly in energy; the carrying of this additional passenger is reflected necessarily by the passing to a more powerful version of the launcher.

The use of heavier orbital means, such as "SPACELAB" or "EURECA," is also possible but would be suitable particularly to confirmed experimental devices. Actually, to the high cost of carrying the experiment resulting from its integration in a complex unit is added the problem of periods which are very long at times between the selection of an experiment and the time when its results are available for analysis. These periods do not make it possible to establish an iterative process. Even when the large capacity offered by the space station is available, many experiments will have to be justified by a prequalification obtained with a less elaborate system.

SUMMARY OF THE INVENTION

This invention has precisely as its object to eliminate all these drawbacks.

For this purpose, the invention recommends a launnching process in which a standard launcher is used (such as ARIANE 4, in the case of flights in polar orbit, or ARIANE 5, whatever the flight may be) in which the capsule is placed like an additional passenger, the capsule being released in transit at the opportune time.

In the first case (ARIANE 4), the sun-synchronous satellites whose launching is provided (SPOT, ERS, HELIOS) will use barely the capacity of an ARIANE 40, and an ARIANE 44P or 42L will be sufficient to use the invention.

In the second case (ARIANE 5), the same remark is a fortiori valid for the polar orbits, the double launching on this orbit appearing as unlikely today. In geostationary transfer orbit, the separation between the cryogenic stage and end stage L7 occurs while the orbital velocity is already reached and makes it possible to consider a short ballistic phase during which the capsule will be released whose orbit then will be adjusted to the desired parameters.

The capacity of ARIANE 5 leads to the though that at least half of the launchings will allow a sufficient capacity for a capsule. The class of satellites of 2,500 to 3,000 kg will be undoubtedly preponderant but satellites of weight close to 2 tons will exist in large numbers. The double launching of two heavy satellites will totally occupy ARIANE 5, while a heavy satellite and an average satellite will leave room for additional weight, insufficient for a satellite having to go into transfer orbit but well suited to a capsule remaining in low orbit.

Of course, the invention is not limited to the ARIANE 4 or 5 launchers. It applies to any launcher since at burnout of the next-to-last stage, the altitude and the velocity obtained are sufficient to obtain a low and stable orbit, i.e. not intersecting the earth's atmosphere. In practice, it will be considered that an orbit is stable since its first perigee is beyond 110 km.

The invention then leads to:

a recoverable capsule which can be used for the requirements of microgravity and using to the maximum the capacity available during the commercial missions of launchers, financial conditions which are attractive because of the auxiliary passenger situation making possible the application of a preferred fixing of rates, the use of elements which are existing or under development coming from research programs on launchers and satellites, a small operational cost thanks to the use of existing installations for the preparation of payloads and their recovery.

More precisely, the invention has as its object a process of launching at least one capsule into space on a low earth orbit, characterized by the fact that it consists in:

using a launcher having multiple stages including a next-to-last stage and a last stage containing at least one satellite to be placed in a more energetic orbit than the orbit aimed at for the capsule, this launcher being such that at burnout of the next-to-last stage, the altitude and the velocity reached are sufficient to correspond to a stable orbit, placing the capsule in the last stage of such a launcher, as an auxiliary passenger, initiating the normal launching of the launcher, releasing the capsule, during the ballistic phase extending between the burnout of the next-to-last stage and the ignition of the last stage, tracking the launching of the last stage to put the satellite or satellites into normal orbit.

This invention also has as its object a launching means which makes it possible to use this process.

BRIEF DESCRIPTION OF THE DRAWINGS

In any case, the characteristics and advantages of the invention will come out better in the light of the following description. This description relates to the embodiments given by way of explanation which is not at all limiting and refers to accompanying drawings in which:

FIG. 1 shows a first launching configuration corresponding to the ARIANE 4 launcher intended for putting a satellite into a sun-synchronous orbit, FIG. 2 shows a second launching configuration corresponding to the ARIANE 5 launcher intended for putting a satellite into a sun-synchronous orbit, FIG. 3 shows a third configuration corresponding to the ARIANE 5 launcher intended for a putting two satellites into geostationary transfer orbit, FIG. 6 illustrates the various phases of release of the capsule according to a second scenario in the case of the ARIANE 5 launcher with putting into geostationary transfer orbit.

DETAILED DISCUSSION OF PREFERRED EMBODIMENTS

Three launching configuration examples will be described which relate to the ARIANE 4 and 5 launchers. They are illustrated in FIGS. 1 to 3.

EXAMPLE A

Example A, illustrated in FIG. 1, corresponds to the ARIANE 4 launcher. Only a launching in low orbit and in particular in sun-synchronous orbit ("SSO" for "Sun-Synchronous Orbit") can be used. Capsule C is placed in low position under a satellite S in the upper part of the launcher called SPELDA (ARIANE 4 External Carrying Structure for Double Launching).

Such a mission corresponds to a putting into circular orbit at 835 km inclined at 98°6. The capsule can carry up to 900 kg of payload in such an orbit (the packaging and the ancillary systems associated with the experiments being included in this load).

The additional performance required in the ARIANE 4 launcher is obtained by the addition of booster rockets (PAP and/or PAL).

EXAMPLE B

Example B is illustrated by FIG. 2 and corresponds to the ARIANE 5 launcher. Capsule C is placed in a low position, under a satellite S, in a short SPELTRA (ARIANE 5 External Carrying Structure for Triple Launching).

The mission corresponds to a putting in sun-synchronous orbit.

Two cases are possible:

the capsule is placed in orbit 835 km/835 km/98°6 (reference orbit corresponding to a satellite of the SPOT family); then there is a return to the orbit of the mission of example A, the storable propulsion stage (EPS) is eliminated, the capsule being injected into a transfer orbit (typically 200 km/835 km/98°6).

The more restricting of the two missions, which seems a priori to be the second, should be carried out.

To assure a satisfactory level of microgravity, the capsule is then to raise the perigee of its orbit to a value of at least 300 km.

In the two cases, the capsule can carry up to 900 kg of payload (with the packaging of the experiments and the specific ancillary systems).

The performance of the launcher being very broadly excessive, there are no special arrangements to make relative to the launcher.

EXAMPLE C

Example C is illustrated in FIG. 3 and corresponds to the ARIANE 5 launcher. Capsule C is placed in a high position above a high satellite SH and a low satellite SB, the group being placed in a long SPELTRA.

In this case, the capsule is placed by ARIANE 5 into orbit 135 km/2,500 km/10°. The capsule is then released after separating from cryogenic main stage (EPC) and before ignition of storable propulsion stage (EPS).

The perigee of the orbit is to be raised by the capsule to an altitude of at least 300 km for the microgravity level to be acceptable.

The capsule can carry a payload of 400 kg (with the packaging of experiments and the specific ancillary systems), when it accompanies a main payload (of the launcher) of 5,600 kg (2 satellites and a long SPELTRA).

Actually, the weight of the payload of the capsule is determined by the residual capacity in geostationary transfer offered by the launcher and the weight of the capsule when empty.

Figure 4:
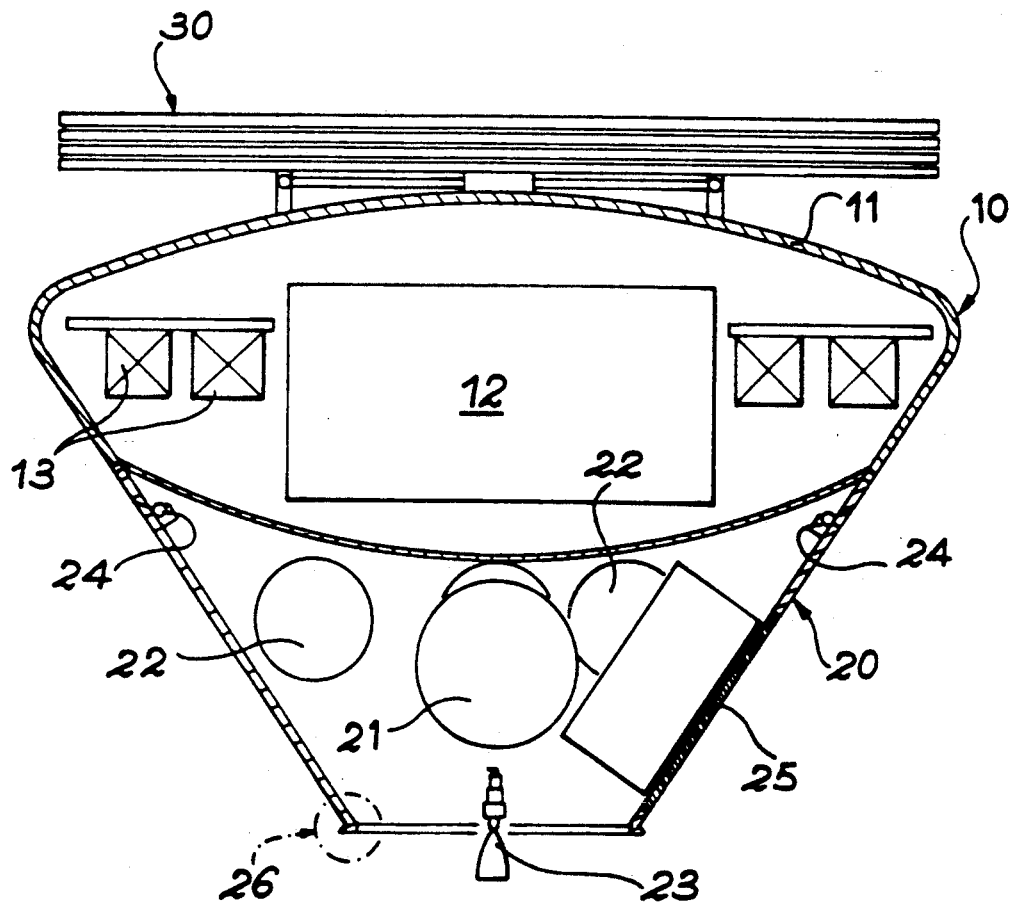
FIG. 4 shows the structure of a capsule able to be launched according to the invention.

By way of pure explanation, a diagram of the structure of a capsule able to be launched according to the invention is shown in FIG. 4. As shown, the capsule comprises a payload module 10, a service module 20 and solar panels 30.

Payload module 10 comprises a thermal shield 11, various units 12 constituting the payload itself and electric batteries 13.

Service module 20 comprises hydrazine tanks 21, gas tanks 22, a hydrazine nozzle 23, cold gas micronozzles 24, placed on the periphery, an entry door 25, an interface 26 with the launcher.

The service module also comprises various means not shown (parachutes, pyrotechnical means, telemetering antennas, means for remote control and tracking, attitude sensors, etc . . . ).

The installation in the launcher of such a capsule is to meet several considerations:

a) The capsule, being an accompanying payload, is to cause the minimum of constraints to the main payload. Except in example C where this is not possible (since the capsule is released "in transit" as will be understood better later), it is preferable that the capsule be in a low position, i.e. contained in a SPELDA (ARIANE 4 case) or of a SPELTRA (ARIANE 5 case). Under these conditions, the form and the dimensions of the useful space of the SPELDA (smaller than the SPELTRA) imply that the capsule is launched "shield upward." This arrangement subjects the capsule to a maximum acceleration of 4 g during the launching in the opposite direction of the acceleration undergone during the reentry into the atmosphere, but the payload does not impose any opposite requirement.

b) The mounting of the capsule in the launcher is to be carried out, if possible, at the level of the cone-shaped part to prevent the thermal shield from being disturbed by a mechanical interface and a separating device which are very loaded mechanically.

c) Finally, an effort is to be made to use launcher/payload adapters which are existing or under development.

These two latter requirements are met by using an 1194 A adapter (provided with its separating device) and by truncating the capsule to the corresponding diameter, which presents no difficulty on the aerodynamic plane.

By way of pure explanation, a homothetic capsule of the APOLLO "Command Module" can be used in a 3.65/3.89 ratio. The dimensions of the capsule are then approximately as follows:

| | |
|---|---|
| large diameter (thermal shield) | 3,650 mm |
| small diameter (base) | 1,194 mm |
| height without the solar generator | 2,440 mm |
| height with the solar generator | 2,740 mm |
| deployed solar generator span | 8,000 mm. |

Two possible scenarios, valid in the case of a mission corresponding to example C (ARIANE 5), will now be described. In these two case, the launcher comprises a next-to-last stage which is a cryogenic main stage (EPC) and a last stage which is an upper composite containing capsule C, a high satellite SH (in an upper SPELTRA), a low satellite SB (in a lower SPELTRA) and a rocket stage L7 with propellants.

Figure 5:
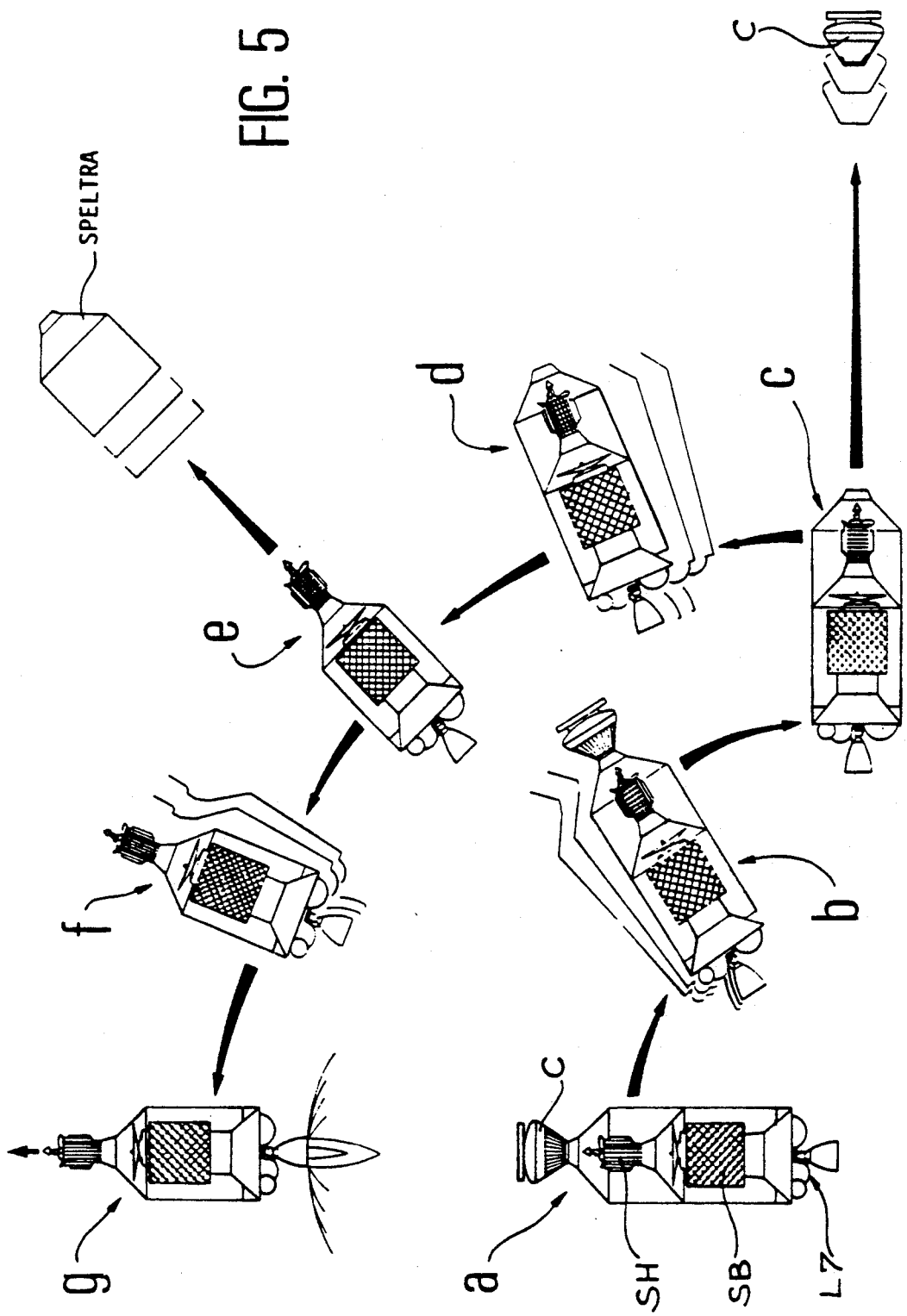
FIG. 5 illustrates the various phases of release of the capsule according to a first scenario in the case of the ARIANE 5 launcher with putting into geostationary transfer orbit.

The first scenario of releasing the capsule, illustrated in FIG. 5, is the following:

after burnout of the cryogenic main stage (EPC) and before ignition of the L7, the upper composite is in the position referenced a;

a first slewing of the upper composite is performed, to make its axis slew from its initial direction toward a first given direction, in the variant illustrated at 90° from the initial direction (positions referenced b and c);

the capsule is released in this first direction with a given velocity, a second slewing of the upper composite toward a second direction is performed in the variant illustrated at 45° from the initial direction or from the second direction (positions referenced d, e);

the upper SPELTRA is released in this second direction, a third slewing of the upper composite is performed to give it its initial direction again (positions referenced f and g), stage L7 is ignited for the normal tracking of the firing toward geostationary transfer orbit (GTO).

During the release of the capsule (position c), the capsule is given such a velocity that at the moment of ignition of the L7 (position g), the capsule is far enough from the composite so as not to be damaged by this ignition. This velocity can be, for example, of 0.5 to 1 m/s. At ignition of L7, the distance covered by the capsule will be about 20 m, which is sufficient.

This releasing operation lasts a little less than 100 s. It causes a slight loss of performance of the launcher (about 100 kg of payload) because of the duration of the ballistic phase and the weight of hydrazine consumed by the attitude control system to perform these maneuvers.

On the one hand, to reduce the duration of the ballistic phase and the hydrazine consumption, and, on the other hand, to increase the capsule-composite distance during the ignition of the storable propulsion stage, a second scenario is possible. It is illustrated in FIG. 6.

After separating from cryogenic main stage (a), the composite is put into rotation in constant angular acceleration (b). The capsule is then released during the rotation of the composite, the longitudinal velocity (due to the springs) and tangential velocity $V_T$ (due to the rotation) being composed to give the capsule a velocity $V_S$ perpendicular to the initial direction of the composite and greater than 1 m/s. The composite then stops its rotation and before leaving again in the other direction, the upper SPELTRA is released (c). The paths of the SPELTRA and of the capsule intersect but not at the same moment. There is therefore no risk of collision. If such were the case, the SPELTRA could always be released in a slightly different plane.

The composite slews in other direction (d) and returns to its initial position (e). Stage L7 is then ignited. At this moment, the capsule is located at more than 30 m, which preserves it from any damage and the operation is shorter and less consumptive of the hydrazine than the preceding one.

The slewing means of the upper composite use the usual means of ARIANE 5 attitude control. The mechanical means for release of the capsule use straps and springs according to a well-known technique. All these operations can be operated by remote control from the launching station on the ground or can be automatic.

We claim:

1. A method of launching at least one capsule into a low earth orbit concurrently with a satellite which is also launched in a more energetic orbit, said method comprising the steps of:

providing a launch vehicle having at least two stages wherein one of said stages is a last stage and another of said stages is a next-to-last stage, wherein said last stage is sufficient to launch said satellite into said more energetic orbit and at burn-out of said next-to-last stage said launch vehicle is in said low earth orbit, wherein between burn-out of said next-to-last stage and ignition of said last stage, there is provided a ballistic phase of flight;

placing said capsule in said last stage of said launch vehicle as an auxiliary passenger;

initiating launch of said launch vehicle; and releasing said capsule during said ballistic phase of flight extending between burn-out of said next-to-last stage and ignition of said last stage wherein between burn-out of said next-to-last stage and said capsule releasing step, the additional step is provided comprised of:

slewing of said launch vehicle last stage, said satellite and said capsule as a composite is performed so as to change direction from an initial direction towards a first given direction; and after said capsule release step, the additional steps are provided comprised of:

slewing said satellite and last stage towards a second direction;

releasing any capsule carrying structure remaining with said last stage and satellite in said second direction;

slewing said satellite and last stage to said initial direction; and delaying ignition of said last stage until said capsule is a sufficient distance so as to not be damaged by ignition of said last stage.

2. The method according to claim 1 wherein said capsule releasing step comprises the steps of:

slewing, at a constant angular acceleration, said launch vehicle last stage, said satellite and said capsule, so as to change direction from an initial direction towards a first given direction and releasing said capsule during said slewing;

slewing said satellite and last stage towards a second direction;

releasing any capsule carrying structure remaining with said last stage and satellite in said second direction;

slewing said satellite and last stage to said additional direction; and delaying ignition of said last stage until said capsule is a sufficient distance so as to not be damaged by ignition of said last stage.

3. The method according to claim 2 wherein said first given direction is about 90° from said initial direction.

4. The method according to claim 2 wherein said second direction is about 45° from said initial direction.

5. The method according to claim 2 wherein said more energetic orbit comprises a sun-synchronous orbit.

6. The method according to claim 2 wherein said more energetic orbit comprises a geostationary orbit.

7. The method according to claim 2 wherein said method is for launching a plurality of capsules, said method includes repeating said first slewing step, said capsule release step, said second slewing step, and said carrying structure release step once for each of said plurality of capsules.

8. An apparatus for launching at least one capsule into a low earth orbit concurrently with a satellite which is also launched in a more energetic orbit, said apparatus comprising:

a launch vehicle having at least two stages wherein one of said stages is a last stage and another of said stages is a next-to-last stage, wherein said last stage comprises a means for launching said satellite into said more energetic orbit and at burn-out of said next-to-last stage said launch vehicle is in said low earth orbit, wherein between burn-out of said next-to-last stage and ignition of said last stage, there is provided a ballistic phase of flight;

means for carrying said capsule in said last stage of launch vehicle as an auxiliary passenger;

means for releasing said capsule during said ballistic phase of flight extending between burn-out of said next-to-last stage and ignition of said last stage;

means for slewing of said launch vehicle last stage, said satellite and said capsule as a composite from an initial direction after burnout of said next-to-last stage and towards a first given direction before release of said capsule;

means for slewing said satellite and last stage towards a second direction after release of said capsule;

means for releasing said capsule carrying means remaining with said last stage and satellite in said second direction;

means for slewing said satellite and last stage to said initial direction; and means for delaying ignition of said last stage until said capsule is a sufficient distance so as to not be damaged by ignition of said last stage.

* * * * *